United States Patent [19]

Pardo et al.

[11] 4,096,766

[45] Jun. 27, 1978

[54] SELF-CONTAINED MODULAR JOINT, NOTABLY FOR ROBOTS

[75] Inventors: Pierre Pardo; François Pruvot, both of Meudon la Foret, France

[73] Assignee: Sofermo, Meudon la Foret, France

[21] Appl. No.: 695,306

[22] Filed: Jun. 11, 1976

[30] Foreign Application Priority Data

Jun. 13, 1975 France ............................... 75 18497

[51] Int. Cl.$^2$ ..................... B25J 17/00; A61F 1/04; F16H 33/00
[52] U.S. Cl. ........................................ 74/640; 3/1.2; 214/1 CM
[58] Field of Search .................. 74/640, 804; 3/1.1, 3/1.2, 12–12.4, 22–29; 214/1 CM

[56] References Cited

U.S. PATENT DOCUMENTS

| 3,033,059 | 5/1962 | Melton et al. | 214/1 CM |
|---|---|---|---|
| 3,435,705 | 4/1969 | Musser | 74/640 |
| 3,883,900 | 5/1975 | Jerard et al. | 3/1.1 |
| 3,987,498 | 10/1976 | Mason | 3/1.1 |

FOREIGN PATENT DOCUMENTS 2,224,349  11/1973  Germany ..................... 214/1 CM Primary Examiner—John J. Vrablik
Assistant Examiner—Leonard Smith
Attorney, Agent, or Firm—Fleit & Jacobson

[57] ABSTRACT

Self-contained modular joint adapted to interconnect two machine elements to permit a relative rotation of less than one revolution therebetween, wherein the first element comprises a strap consisting of a pair of wing-like extensions encompassing the second element in such a manner that said second element can pivot between said two wing extensions, each wing extension of said strap being provided with a bore concentric to the axis of said relative rotation, said bore being adapted to be engaged by members of revolution each adapted to center and position in the axial direction an inner race of rolling contact bearings capable of absorbing axial and radial efforts, the outer race of each one of said bearings being carried by a member of revolution centered and secured to said second element so as to constitute between said two elements a joint free of both axial and radial play, wherein one of said two members of revolution secured to said second element has fitted thereon the toothed annulus of a reduction gearing while the other element of said reduction gearing is secured to said member of revolution rigid with the wing extension of said strip which is opposite said member of revolution rigid with said second element, said joint being further characterized in that said member of revolution also supports a control motor adapted to drive said reduction bearing in such a manner that all the essential component elements of the joint are distributed along the axis of rotation about which one machine element can pivot in relation to the other element to an extent of less than one revolution.

5 Claims, 1 Drawing Figure

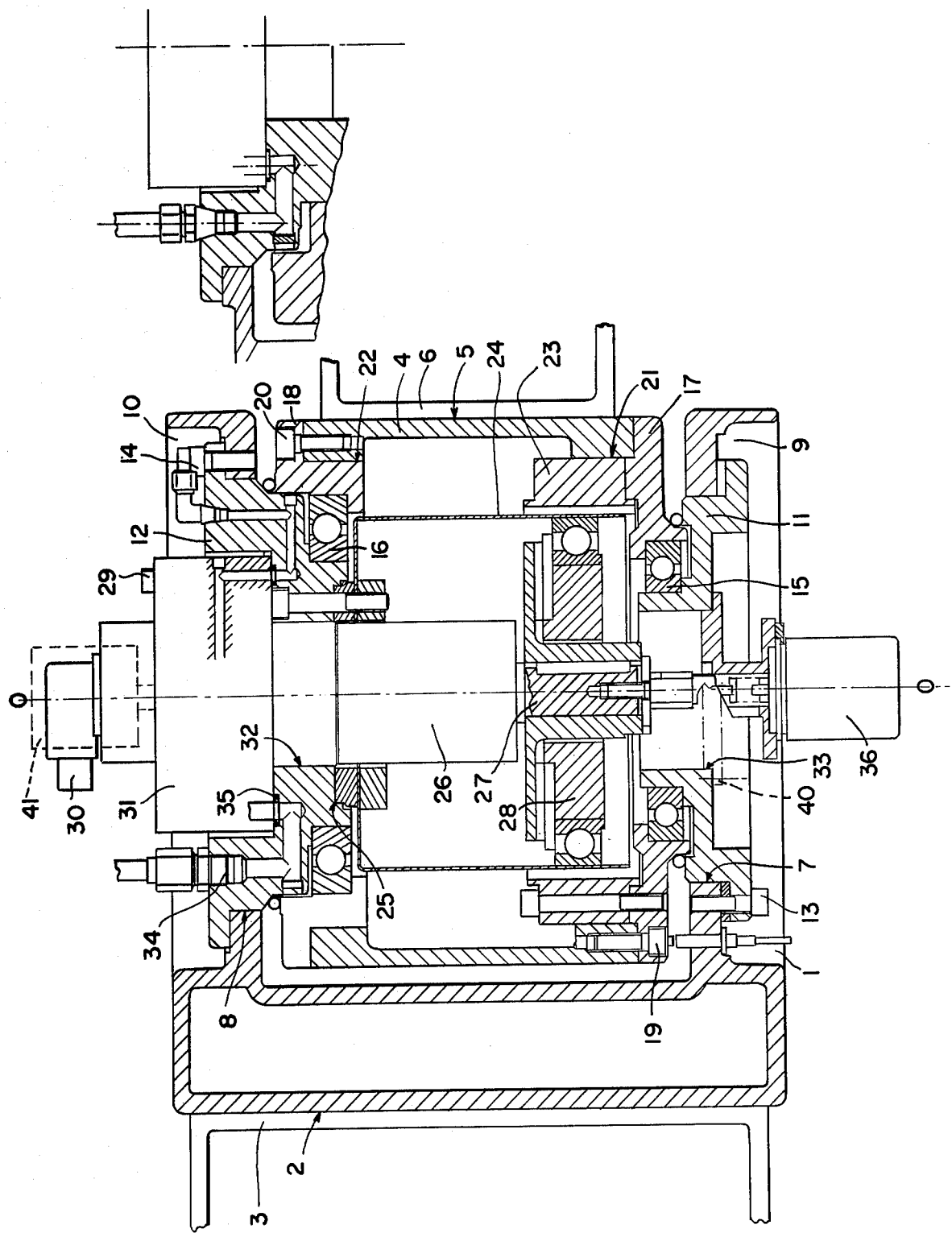

SELF-CONTAINED MODULAR JOINT, NOTABLY FOR ROBOTS

This invention relates to self-contained modular joints, notably for various mechanisms and more particularly for robots, manipulators or the like. It is directed inter alia to a self-contained modular joint or articulation adapted to pivotally interconnect two machine elements while permitting the rotation of one element through less than one revolution in relation to the other element.

Many mechanisms and especially robots or manipulators comprise joints or articulation capable of permitting a relative angular movement of less than 360° between two elements (i.e. less than one full revolution). As a rule, these joints are designed in the form of devices that cannot be separated from the assembly in which they are incorporated.

However, these known arrangement are attended by various inconveniences:

The mechanism or robot in which they are inserted constitutes an assembly designed once and for all, and any extension or variation of its possibilities cannot be contemplated unless it is redesigned completely;

the joint thus constructed is generally well adapted to the mechanism in which it is incorporated but in most instance neither its over-all dimensions nor its cost have the optimum values;

a member incorporated or integrated in an assembly according to this prior art technique cannot lend itself to further technological developments; therefore, its performances are rather behind or technological possibilities.

It is the essential object of the present invention to avoid these inconveniences by providing a self-contained modular joint.

It is well known in various technological fields that the construction of any device by means of a number of modular components having each a well-defined function is particularly advantageous from various points of view.

Provided that constant over-all and assembling dimensions are preserved, the technological character of each component element may change or vary freely. The cost and also the performances of each element may thus have the desired optimum values.

Moreover, with this invention, constructing any novel mechanism, notably a robot, consists simply in assembling standardized elements by means of special yet particularly simple members. Therefore, if each modular element exists in several sizes, it is possibly under any circumstances to select the optimum size for the specific application contemplated without having to make the least preliminary study.

According to this invention, the self-contained modular joint intended for interconnecting two machine components while permitting a relative rotation of said components through less than one revolution, is characterized in that the first component comprises a strap having two wing extensions encompassing the second component in such a manner that this second component can pivot between said wing extensions about an axis of rotation perpendicular to said wing extensions, each wing extension of said strap having formed therein a bore concentric to said axis of rotation for receiving members of revolution for centering and positioning in the axial direction an inner ring for bearings adapted to absorb axial and radial efforts, the outer race of said bearings being carried by members of revolution centered and secured to said second component in order to constitute between said components a joint free of axial and radial play, in that one of said pair of members of revolution secured to said second component has fitted thereto the toothed annulus of a reduction gearing while the other gear of said reduction gearing is fastened to said member of revolution rigid with the wing extension of said strap which is opposite the member of revolution rigid with said second component, and that said member of revolution rigid with said wing also carries a hydraulic motor for driving said reduction gearing.

According to a typical form of embodiment of this invention, said reduction gearing is of the harmonic drive type, i.e. of the distortion-wave harmonic gear type characterized not only by an extreme simplicity due to the small number of parts constituting said gearing but also by high capacities and performances.

According to another feature characterizing this invention, the joint module comprises all the mechanical component elements necessary for its operation, the power control means and the position coder permitting of measuring the relative position of the two components.

Other features and advantages of this invention will appear as the following description proceeds with reference to the accompanying drawing of which the single FIGURE illustrates diagrammatically by way of example a typical form of embodiment shown in vertical section taken along the axis 0—0 of the joint.

In the example illustrated the modular, self-contained joint comprises a first element 1 adapted through its surface 2 and with the assistance of fastening means (not shown) to be secured to a structure 3 of any desired mechanism, for instance a robot.

Another component 4 may through a surface 5 and with the assistance of fastening means (not shown) be secured to the structure 6 of the second member of the mechanism or robot to be pivotally connected to the structure 3.

Opposite the structure 3 the first element 1 comprises a pair of wing extensions 9, 10 such that said element 1 and the pair of wing extensions 9, 10 form together a U-shaped or strap structure adapted to receive between said wing extensions 9, 10 the other element 4. Bores 7 and 8 are formed through the wing extensions 9, 10 respectively along a common axis 0—0 shown by a dash and dot line in the figure as constituting an axis of revolution. Said bores 7, 8 are engaged by corresponding members of revolution 11, 12, respectively, secured by screws 13, 14 to the wing extensions 9, 10 and carrying the inner races of a pair of rolling-contact bearings 15 and 16, respectively, which may be of the tapered roller, ball or oblique contact types. The outer races of these bearings are carried by a pair of members of revolution 17, 18 secured by means of screws 19, 20 respectively on either side of the second element 4.

Thus, the second element 4 having inner extensions in the form of its members of revolution 17, 18 may pivot on the rolling contact bearings 15, 16 in relation to the first element 1 and inside the members of revolutions 11, 12 rigid therewith due to the presence of its wing extensions 9 and 10, respectively.

The members of revolution 17, 18 are centered to the second element 4 by means of centering bores 21, 22 so that the bearing races 15 and 16 are mounted coaxially to each other.

Moreover, the member of revolution 17 supports the outer toothed annulus 23 of a reduction gearing so that said annulus 23 lies inside the second element 4. Said annulus 23 is also centered by the same bore 21 of element 4. It is assumed that the reduction gearing is of the harmonic drive type, i.e. of the distortion-wave harmonic type. Distortion wave harmonic drive gearing systems are well-known and a typical harmonic wave generator suitable for use in the present preferred embodiment is disclosed in U.S. Pat. No. 2,906,143 issued to Musser.

As a rule, this mechanism comprises three coaxial members, namely: a toothed annulus, constituting for instance the reaction member, a flexible toothed wheel and a wave generator, generally in the form of an ellipsoidal cam member. Typically, the toothed annulus is referred to as a "circular spline" and the flexible toothed wheel is comprised of a ball-bearing with a flexible tooth ring called a "flexspline". The flexspline is provided with a number of teeth which is less than the number of teeth provided in the circular spline, whereby for each turn of the wave generator or the ellipsoidal cam operating inside the flexible tooth ring, the circular spline will turn in the contrary sense by an amount related to the difference between the number of teeth of the cooperating elements.

Secured to the member of revolution 12 rigid with the wing extension 10 of the first element and inside the second member 4 is bell 24 of the reduction gearing which is centered by the blind bore 25.

Also secured to the same member of revolution 12 is a hydraulic motor 26 of which the shaft 27 is coincident with the axis of rotation 0—0 of the self-contained modular joint and carries the disc 28 driving the reduction gearing. In the embodiment being described, the hydraulic motor 26, by means of drive shaft 27, drives the disc 28 which comprises the wave generator or, as denoted above, the flexspline. In this manner, a stress or strain is applied to the bell 24, the teeth of which are in engagement with the teeth of the annulus 23, which was denoted above as the circular spline. Therefore, the movable element 4 is also caused to be driven because the annulus 23 is firmly affixed to the movable element 4.

The hydraulic motor 26 is secured by means of screws 29 to the member of revolution 12 so that it can be removed without disconnecting the drive between the two elements constituting the self-contained modular joint. Thus, the hydraulic motor 26 may be replaced by another motor on the site, in a workshop without disassembling the robot mechanism proper.

This hydraulic motor 26 is adapted rotatably to drive a position coder 36. Said motor is supplied with hydraulic fluid under pressure through a servo valve 30 secured to a block 31 rigidly secured to the hydraulic motor 26 and also to the member of revolution 12 by means of screws 29. This motor 26 is centered by means of a bore 32 in said member of revolution 12. Another bore 33 formed in the member of revolution 11 rigid with wing extension 9 permits of disconnecting the reduction gearing driving disc 28 when it is desired to remove the gearing without disconnecting the two machine elements 3 and 5 from each other.

The hydraulic connections for supplying high-pressure and low-pressure fluid to the joint comprise a single direct pipe fitting 34 provided in the member of revolution 12 so that the hydraulic motor can be coupled automatically through gaskets 35 when said motor is secured by means of screws 29.

In the attached drawing a position coder 36 is secured to the member of revolution 11 by means of a support 40 centered in the bore 33 for disconnecting the reduction gearing. This coder may as well be coupled directly to the motor 26 by means of another stub shaft emerging from the block 31. According to an arrangment 41 illustrated in dash lines, in this case the servo valve would be disposed on one side, the bore 33 being closed by a cover in order to preserve the fluid tightness of the internal volume of component 4. The position coder 36 may be of the well-known type which are generally denoted as angle encoders. Such encoders are well-known and are typically employed in radar systems and/or spacecraft systems wherein it is desired to learn the extent of rotation or translation of a movable member which is remote from the operator. Typically, such encoders produce an electrical signal which is related to the amount of angular rotation which the encoder shaft has undergone. Such electrical signal may be either a signal of a varying resistance or may in fact be a specifically coded signal such as the Gray code.

Although a specific form of embodiment of this invention has been described hereinabove and illustrated in the accompanying drawing, it will readily occur to those skilled in the art that various modifications and changes may be brought thereto without departing from the scope of the invention as set forth in the appended claim.

What is claimed as new is:

1. Self-contained modular joint adapted to interconnect two machine elements to permit a relative rotation of less than one revolution therebetween, wherein the first element comprises a strap consisting of a pair of wing-like extensions encompassing the second element in such a manner that said second element can pivot between said two wing extensions, each wing extension of said strap being provided with a bore concentric to the axis of said relative rotation, said bore being adapted to be engaged by first and second members of revolution each adapted to center and position in the axial direction an inner race of rolling contact bearings capable of absorbing axial and radial efforts, the outer race of each one of said bearings being carried by third and fourth members of revolution centered and secured to said second element so as to constitute between said two elements a joint free of both axial and radial play, wherein one of said third and fourth members of revolution secured to said second element has fitted thereon a toothed annulus of a reduction gearing assembly and wherein another element of said reduction gearing assembly comprises a flexible toothed ring which is secured to one of said first and second members of revolution rigid with the wing extension of said strap which is opposite said one of said third and fourth members of revolution rigid with said second element having said annulus secured thereto, said joint being further characterized in that said one of said first and second members of revolution also supports a control motor having a drive shaft mechanically connected to said reduction gearing assembly so as to drive said reduction gearing in such a manner that all the essential component elements of the joint are distributed along the axis of rotation about which one machine element can pivot in relation to the other element to an extent of less than one revolution.

2. Self-contained modular joint according to claim 1, characterized in that said control motor is a hydraulic motor located inside said flexible toothed ring of said reduction gearing assembly so as to drive said flexible toothed ring by means of a disc rigidly connected to said drive shaft, and that the mechanical mounting and the hydraulic coupling of said motor are obtained directly on said second member of revolution secured to one of said wing extensions of said strap.

3. Self-contained modular joint according to claim 2, characterized in that said first member of revolution secured to the wing extension of the strap is opposite the member of revolution supporting said hydraulic motor has a central bore formed therein which permits of disconnecting said motor from the reduction gearing driving disc.

4. Self-contained modular joint according to claim 2, characterized in that a position coder is secured directly to the stub shaft of said hydraulic motor opposite the means securing said motor to the strap in alignment with the axis of rotation.

5. Self-contained modular joint according to claim 2, characterized in that a position coder is secured directly to the motor by means of a second stub shaft of said motor along the axis of rotation.

* * * * *